(12) United States Patent
Oya (10) Patent No.: US 8,053,062 B2
(45) Date of Patent: Nov. 8, 2011

(54) BIAXIALLY DRAWN MULTILAYER LAMINATED FILM AND METHOD FOR PRODUCING THE SAME

(75) Inventor: Taro Oya, Kanagawa (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 12/709,069

(22) Filed: Feb. 19, 2010

(65) Prior Publication Data

US 2010/0143680 A1 Jun. 10, 2010

Related U.S. Application Data (62) Division of application No. 11/549,018, filed on Oct. 12, 2006, now abandoned, which is a division of application No. 10/476,572, filed as application No. PCT/JP03/02073 on Feb. 25, 2003, now abandoned.

(30) Foreign Application Priority Data

| Mar. 1, 2002 | (JP) | 2002-055488 |
| Jun. 19, 2002 | (JP) | 2002-178364 |
| Oct. 16, 2002 | (JP) | 2002-301439 |
| Oct. 16, 2002 | (JP) | 2002-301440 |

(51) Int. Cl.
 *B32B 7/02* (2006.01)
(52) U.S. Cl. ........ 428/212; 428/213; 428/220; 428/339; 428/411.1; 428/480; 428/910
(58) Field of Classification Search ............... 428/212, 428/213, 220, 339, 411.1, 480, 910
See application file for complete search history.

(56) References Cited

U.S. PATENT DOCUMENTS

| 4,606,976 A | 8/1986 | Hensel et al. |
| 4,798,759 A | 1/1989 | Dallman et al. |
| 5,324,467 A | 6/1994 | Anderson, II |
| 5,882,774 A | 3/1999 | Janza et al. |
| 6,080,467 A | 6/2000 | Weber et al. |
| 6,677,031 B1 | 1/2004 | Murooka et al. |
| 6,787,218 B2 | 9/2004 | Peiffer et al. |
| 2004/0069977 A1 | 4/2004 | Oya et al. |

FOREIGN PATENT DOCUMENTS

| EP | 1164008 | 12/2001 |
| JP | 56-99307 A | 8/1981 |
| JP | 9-506837 C | 7/1997 |
| JP | 09-300518 A | 11/1997 |
| JP | 10-278157 A | 10/1998 |
| JP | 2000-141567 | 5/2000 |
| JP | 2002-509043 | 3/2002 |
| WO | 95/17303 A | 6/1995 |
| WO | 96/19347 A | 6/1996 |
| WO | 97/01778 | 1/1997 |
| WO | 99/36262 A2 | 7/1999 |
| WO | 0147711 A1 | 7/2001 |

*Primary Examiner* — David Sample
*Assistant Examiner* — Lawrence Ferguson
(74) *Attorney, Agent, or Firm* — Sughrue Mion, PLLC (57) ABSTRACT

A film composed of a number of layers having different refractive indices and alternately laminated one upon another has characteristic optical properties by light interference. Conventional films having such structure have problems of poor interlaminar adhesivity and low tear strength. The problems are solved by a film having the following constitution. A biaxially drawn multilayer laminated film is composed of alternately laminated 1st layers and 2nd layers at a total layer number of 11 or more. Each layer has a thickness of 0.05 to 0.5 μm. The 1st layer is made of a crystalline thermoplastic resin and the 2nd layer is made of a crystalline thermoplastic resin having a composition different from that of the resin constituting the 1st layer. The maximum light reflectance of the film within the wavelength range of 350 to 2,000 nm is higher than the base line reflectance obtained from a light reflectance curve within the wavelength range of 350 to 2,000 nm by 20% or more.

3 Claims, 1 Drawing Sheet

Figure 1

BIAXIALLY DRAWN MULTILAYER LAMINATED FILM AND METHOD FOR PRODUCING THE SAME

CROSS REFERENCE TO RELATED APPLICATIONS

This is a divisional of application Ser. No. 11/549,018 filed Oct. 12, 2006, which is a divisional of application Ser. No. 10/476,572 filed Oct. 31, 2003, which is a 371 Application of PCT/JP03/02073 filed Feb. 25, 2003. The entire disclosure of the prior applications is hereby incorporated by reference.

TECHNICAL FIELD

The present invention relates to a multilayer laminated film composed of alternately and regularly arranged layers having low refractive index and layers having high refractive index and selectively reflecting light of an arbitrary wavelength range according to the refractive index difference between the layers and the thickness of each layer.

BACKGROUND TECHNOLOGY

A multilayer laminated film composed of a number of layers having low refractive index and a number of layers having high refractive index alternately laminated one upon another may form an optical interference film selectively reflecting or transmitting light of a specific wavelength by the structural light interference between the layers. Such multilayer laminated film may form a film having excellent design by the structural color development, for example a pearlescent film having iridescent appearance by setting the wavelength of the selectively reflecting or transmitting light in a visible light range. The obtained design is based on the structural color development of the multilayer laminate film and, accordingly, there is no color fading trouble in contrast with the color developed by a dye, etc. A high reflectance comparable to that of a film produced by using a metal can be attained by the multilayer laminated film by gradually changing the film thickness or laminating films having different reflection peaks, and such film can be used as a metallic luster film or a reflecting mirror.

Multilayer laminated films produced by using different kinds of thermoplastic resins such as polyethylene terephthalate and polymethyl methacrylate have been proposed as such multilayer laminated film for example in the specification of the JP-A 56-99307 (hereunder JP-A means "Japanese Unexamined Patent Publication"). Multilayer drawn films produced by using a layer of polyethylene 2,6-naphthalenedicarboxylate as the layer having high refractive index were proposed in the specifications of JP-C 9-506837 (hereunder JP-C means published Japanese translations of PCT international publication for patent applications) and WO01/47711.

However, these multilayer laminated films have poor adhesion between the layers to occasionally cause the delamination defect because resins having different compositions are combined with each other in these films to increase the refractive index difference between the layers. Furthermore, the uniform drawing becomes difficult to form an easily tearable film having insufficient strength by the combination of resins having different compositions.

Namely, the refractive index difference between the layers of conventional multilayer drawn film was originated from the refractive index difference of the resins constituting the layers. For example, polyethylene terephthalate was used in the layer having high refractive index and a resin having low refractive index such as polymethacrylate was used in the layer having low refractive index as disclosed in JP-A 56-99307. The concept of the conventional method to get the refractive index difference between layers by the refractive indices of the resins necessitates the selection of resins having considerably different compositions as the resins constituting the layers and the adhesivity between layers becomes poor.

Examples shown in JP-C 9-506837 and WO01/4771 contain a biaxially drawn film produced by using a polyethylene 2,6-naphthalenedicarboxylate (hereunder sometimes referred to as PEN) having high refractive index as the layer having high refractive index and a thermoplastic elastomer as the layer having low refractive index and a uniaxially drawn multilayer film produced by using PEN having high refractive index as the layer having high refractive index and a PEN copolymerized with 30 mol % isophthalic acid as the layer having low refractive index. The layer having low refractive index is essentially amorphous in these multilayer laminated film and these films have latent practical problems to fail in getting a sufficient interlayer adhesion even by the drawing treatment and in achieving uniform biaxial drawing in the plane directions to cause non-uniform properties.

DISCLOSURE OF THE INVENTION

The object of the present invention is to solve the problems of the conventional technology and obtain a multilayer laminated film having high interlayer adhesivity and high tearing resistance. The object can be achieved by the present invention described as follows.

One of the embodiments of the present invention is a biaxially drawn multilayer laminated film produced by alternately laminating the 1st layers and the 2nd layers to the total layer number of 11 or over and subjecting the laminate to biaxial drawing, wherein each layer has a thickness of 0.05 to 0.5 μm, the 1st layers are composed of a crystalline thermoplastic resin, the 2nd layers are composed of a crystalline thermoplastic resin having a composition different from the resin constituting the 1st layer, the maximum reflectance of light in the wavelength range of 350 to 2,000 nm is higher than the base-line reflectance obtained by the light reflectance curve in the wavelength range of 350 to 2,000 nm by 20% or more, the film has plural melting points determined by the differential scanning calorimetry, the difference between the melting points is 5° C. or over and the film has at least one crystallization peak determined by the differential scanning calorimetry.

Another embodiment of the present invention is a biaxially drawn multilayer laminated film produced by alternately laminating the 1st layers and the 2nd layers to the total layer number of 11 or over and subjecting the laminate to biaxial drawing, wherein each layer has a thickness of 0.05 to 0.5 μm, the 1st layers are composed of a polyester composition, the 2nd layers are composed of a polyester composition having a composition different from the resin constituting the 1st layer, the maximum reflectance of light in the wavelength range of 350 to 2,000 nm is higher than the base-line reflectance obtained by the light reflectance curve in the wavelength range of 350 to 2,000 nm by 20% or more, and the ratio of ethylene terephthalate component or ethylene 2,6-naphthalenedicarboxylate component in the film is 80 mol % or over based on the total repeating units of the polyester.

One of the production methods of the present invention to produce a biaxially drawn multilayer laminated film comprises a step to form a sheet by alternately laminating a crystalline thermoplastic resin for the 1st layers and a thermoplastic resin for the 2nd layers having a melting point lower than that of the crystalline thermoplastic resin for the 1st layer by 15° C. or over to a total layer number of 11 or over, a step to draw the obtained sheet in the film-forming direction and the lateral direction at a draw ratio of 2 to 50 each, and a step to heat-set the drawn sheet at a temperature between the temperature lower than the melting point of the crystalline thermoplastic resin for the 2nd layer by 10° C. and the temperature lower than the melting point of the crystalline thermoplastic resin for the 1st layer by 15° C.

Another production method of the present invention to produce a biaxially drawn multilayer laminated film comprises a step to form a sheet by alternately laminating a polyester for the 1st layers and a polyester for the 2nd layers having a melting point lower than that of the polyester for the 1st layer by 15° C. or over to a total layer number of 11 or over, a step to draw the obtained sheet in the film-forming direction and the lateral direction at a draw ratio of 2 to 50 each, and a step to heat-set the drawn sheet at a temperature between the temperature lower than the melting point of the polyester for the 2nd layer by 10° C. and the temperature lower than the melting point of the polyester for the 1st layer by 15° C. provided that the polyester for the 1st layer is a polyester composed mainly of ethylene terephthalate and having a melting point of 250 to 260° C. or a polyester composed mainly of ethylene 2,6-naphthalenedicarboxylate and having a melting point of 260 to 270° C.

The film having the above constitution and the film produced by the above production method have excellent biaxial drawability and interlayer adhesivity even in the case of using a resin constituting the layer having high refractive index and having a composition ultimately close to the composition constituting the layer having low refractive index by lowering the melting point of the resin constituting the layer having low refractive index below the melting point of the resin constituting the layer having high refractive index and relaxing the molecular orientation of the layer composed of the resin having low melting point after the biaxial drawing process. The present invention adopts the combination of resins constituting the layers and having compositions extremely close to each other which has been supposed to be difficult to realize the refractive index difference between the layers and, nevertheless, imparts a multilayer laminated film with sufficient strength and interlayer adhesivity and, surprisingly, imparts sufficient refractive index difference between the layers.

BRIEF EXPLANATION OF THE DRAWING

The FIG. 1 is a reflectance of the biaxially drawn multilayer laminated film.

BEST MODE FOR CARRYING OUT THE INVENTION

The biaxially drawn multilayer laminated film of the present invention is composed of the 1st layers and the 2nd layers alternately laminated one upon another at a total layer number of 11 or more. The compositions constituting the 1st layer and the 2nd layer are extremely close to but different from each other. When the number of laminated layers is less than 11, the selective reflection by the multiple interference becomes too small to get a sufficient reflectance. The upper limit of the number of the laminated layers is at most 501 from the viewpoint of productivity, etc.

The single layer thickness of the 1st and the 2nd layers is 0.05 to 0.5 µm to achieve the selective light reflection by the light interference between the layers. The selective reflection of the multilayer laminated film of the present invention is realized in the range of ultraviolet rays, visible rays and near infrared rays by properly adjusting the layer thickness. When the thickness of each layer is smaller than 0.05 µm, the reflection performance cannot be attained by the absorption of the component constituting the film. On the other hand, when the layer thickness is thicker than 0.5 µm, the light selectively reflected by the light inference between layers reaches the range of infrared light to fail in achieving the utility as an optical property. Hereunder, the layer having high refractive index is called as the 1st layer and the layer having low refractive index is called as the 2nd layer for the convenience of explanation.

Figure 1:
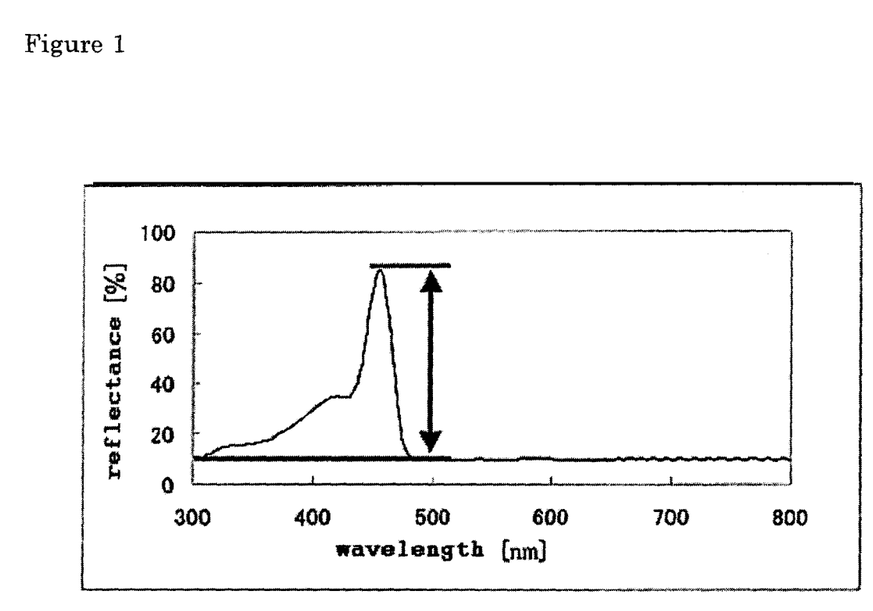

The biaxially drawn multilayer laminated film of the present invention has a reflection peak of a reflection curve between 350 to 2,000 nm wavelength having the maximum reflectance higher than the base line of the reflectance by 20% or over, preferably 30% or over, and more preferably 50% or over. The FIG. 1 shows an example of the reflectance curve of the biaxially drawn multilayer laminated film of the present invention. In the FIG. 1, the sign 1 is the difference between the maximum reflectance and the base line of reflectance, and the sign 2 shows the base line of reflectance. When a reflection peak having the maximum reflectance higher than the base line of reflectance by 20% or over is absent in the biaxially drawn multilayer laminated film, the film cannot be used as an optical interference film such as a pearlescent film to selectively reflect or transmit the light of a specific wavelength.

Crystalline Thermoplastic Resin

The most significant characteristic of the present invention is the melting of either one resin among at least two kinds of crystalline resins having different melting points to impart a refractive index difference and improve the interlayer adhesivity. Accordingly, similar conception can be applied to not only crystalline polyester resins but also any crystalline thermoplastic resins provided that the resin can produce a multilayer drawn film having at least one crystallization temperature and plural melting points having a temperature difference of 5° C. or over by the determination with a differential scanning calorimeter. Further effects for imparting refractive index difference and improving the interlaminar adhesivity can be attained by the combination of crystalline thermoplastic resins having different refractive indices by themselves.

There is no particular restriction on the kind of the resin provided that the resins satisfy the above requirements, and preferable examples of the combination of thermoplastic resins are polyethylene 2,6-napththalenedicarboxylate and a polyethylene terephthalate copolymerized with isophthalic acid, polyethylene 2,6-naphthalenedicarboxylate and a polyethylene terephthalate copolymerized with 2,6-naphthalenedicarboxylic acid, crystalline nylon MXD6 and crystalline nylon 6, crystalline nylon MXD6 and crystalline MXD6 copolymerized with nylon 6, polyethylene terephthalate and crystalline polylactate resin, and polyethylene 2,6-naphthalenedicarboxylate and crystalline polylactate resin.

The additional impartment of the refractive index difference or improvement of interlaminar adhesivity cannot be attained by the use of an amorphous resin to either one or both layers (e.g. the combination of polyethylene terephthalate and polymethacrylate described in JP-A 56-99307, the combination of polyethylene 2,6-naphthalenedicarboxylate and an amorphous thermoplastic elastomer described in JP-C 9-506837 and WO01/47711, and the combination of polyethylene 2,6-naphthalenedicarboxylate and an amorphous PEN copolymerized with 30 mol % isophthalic acid).

PEN-Based or PET-Based Resin

Repeating the aforementioned explanation, the most significant characteristic of the present invention is the impartment of sufficient refractive index difference between the 1st layer and the 2nd layer constituting the biaxially drawn multilayer laminated film having the above thicknesses without using the conventional refractive index difference of the resins. The impartment of sufficient refractive index difference between the 1st and the 2nd layers constituting the biaxially drawn multilayer laminated film without using the refractive index difference of the resins can be carried out e.g. by imparting the film with the refractive index difference by the heat-treatment after drawing. In the biaxially drawn multilayer laminated film of the present invention, resins having extremely close compositions can be selected as the resins constituting the 1st layers and the 2nd layers, and the adhesivity of the layers is remarkably improved by the selection of the resins having close compositions.

Such resins selectable in the present invention are polyesters containing ethylene terephthalate component as not less than 80 mol % of the total repeating units (PET-based resin), and polyesters containing ethylene 2,6-naphthalenedicarboxylate component as not less than 80 mol % of the total repeating units (PEN-based resin). The interlaminar adhesivity becomes poor when the amount of the ethylene terephthalate component or the ethylene 2,6-naphthalenedicarboxylate is less than 80 mol % of the total repeating units.

The preferable embodiments of a film having an ethylene terephthalate content of not less than 80 mol % of the total repeating units of the polyester are described below. The film has two or more melting points determined by differential scanning calorimetry and the difference between the melting points is 5° C. or over, the film has a crystallization peak within the range of 100° C. to 190° C. determined by differential scanning calorimetry, terephthalic acid or isophthalic acid component accounts for 1.5 to 20 mol % of the total repeating units in the film, the polyester constituting the 1st layer is a crystalline polyester and ethylene terephthalate component accounts for at least 95 mol % of the total repeating units, the polyester constituting the 2nd layer is a crystalline polyester and ethylene terephthalate component accounts for 75 to 97 mol % of the total repeating units, and the film has breaking strength of 50 MPa or higher in both film-forming direction and lateral direction. Biaxially drawn multilayer laminated films satisfying either one of the above requirements are also provided.

When ethylene terephthalate component accounts for at least 80 mol % of the total repeating units, the copolymer component other than the ethylene terephthalate is preferably 2,6-naphthalenedicarboxylic acid or isophthalic acid component effective for the lowering of the melting point. The copolymerizing ratio of the 2,6-naphthalenedicarboxylic acid or isophthalic acid component is 1.5 to 20 mol % based on the repeating units. When the molar number of the 2,6-naphthalenedicarboxylic acid or isophthalic acid component is smaller than the lower limit, a sufficient refractive index difference is difficult to form between the 1st layer and the 2nd layer and, when the molar number of the 2,6-naphthalenedicarboxylic acid or isophthalic acid component is larger than the upper limit, the difference of the compositions of the polyesters constituting the 1st layer and the 2nd layer becomes large and the lowering of the interlaminar adhesivity is liable to occur.

The preferable embodiments of a film having an ethylene 2,6-naphthalenedicarboxylate content of not less than 80 mol % of the total repeating units of the polyester are described below. The film has two or more melting points determined by differential scanning calorimetry and the difference between the melting points is 5° C. or over, the film has a crystallization peak within the range of 150° C. to 220° C. determined by differential scanning calorimetry, terephthalic acid or isophthalic acid component accounts for 1.5 to 20 mol % of the total repeating units in the film, the polyester constituting the 1st layer is a crystalline polyester and ethylene 2,6-naphthalenedicarboxylate component accounts for at least 95 mol % of the total repeating units, the polyester constituting the 2nd layer is a crystalline polyester and ethylene 2,6-naphthalenedicarboxylate component accounts for 75 to 97 mol % of the total repeating units, and the film has breaking strength of 100 MPa or higher in both film-forming direction and lateral direction. Biaxially drawn multilayer laminated films satisfying either one of the above requirements are also provided.

When ethylene 2,6-naphthalenedicarboxylate component accounts for at least 80 mol % of the total repeating units, the copolymer component other than the ethylene 2,6-naphthalenedicarboxylate is preferably terephthalic acid or isophthalic acid component effective for the lowering of the melting point. The copolymerizing ratio of the terephthalic acid or isophthalic acid component is 1.5 to 20 mol % based on the repeating units. When the molar number of the terephthalic acid or isophthalic acid component is smaller than the lower limit, a sufficient refractive index difference is difficult to form between the 1st layer and the 2nd layer and, when the molar number of the terephthalic acid or isophthalic acid component is larger than the upper limit, the difference of the compositions of the polyesters constituting the 1st layer and the 2nd layer becomes large and the lowering of the interlaminar adhesivity is liable to occur.

The 1st Layer of the PET-Based Resin

In the present invention, the resin constituting the 1st layer is preferably a polyester containing ethylene terephthalate component as a main repeating unit. More preferably, the resin is a homo-polyethylene terephthalate or a copolymerized polyethylene terephthalate containing ethylene terephthalate component as not less than 90 mol % of the repeating units to keep the melting point at a high level compared with the after-mentioned PET-based polyester constituting the 2nd layer. When the molar number of the ethylene terephthalate component is smaller than 90 mol % of the repeating units, the melting point becomes too low to get a melting point difference from the PET-based polyester constituting the 2nd layer and, as a result, it is difficult to apply a sufficient refractive index difference to the multilayer drawn film. Homopolyethylene terephthalate is especially preferable among these PET-based polyesters to keep a high melting point.

Preferable examples of the copolymerizing component other than ethylene terephthalate component are acid components, e.g. other aromatic carboxylic acids such as isophthalic acid, 2,6-naphthalenedicarboxylic acid and 2,7-naphthalenedicarboxylic acid; aliphatic dicarboxylic acids such as adipic acid, azelaic acid, sebacic acid and decanedicarboxylic acid; and alicyclic dicarboxylic acids such as cyclohexanedicarboxylic acid; and glycol components, e.g. aliphatic diols such as butanediol and hexanediol and alicyclic diols such as cyclohexanedimethanol.

The melting point of the resin constituting the PET-based 1st layer is preferably between 250° C. and 260° C. to keep a relatively large melting point difference from the after-mentioned resin constituting the PET-based 2nd layer. When the melting point of the resin constituting the 1st layer is lower than the lower limit, the melting point difference from the resin constituting the 2nd layer becomes too small and the application of a sufficient refractive index difference to the produced multilayer drawn film becomes difficult. The melting point of a polyethylene terephthalate free from copolymerized unit is usually 256° C. or thereabout.

The 1st Layer of the PEN-Based Resin

A polyester composed of ethylene 2,6-naphthalenedicarboxylate component as a main repeating unit is also preferable in the present invention as the resin constituting the 1st layer. More preferably, the resin is a homo-polyethylene 2,6-naphthalenedicarboxylate or a copolymerized polyethylene 2,6-naphthalenedicarboxylate containing ethylene 2,6-naphthalenedicarboxylate unit as not less than 90 mol % of the repeating units to keep the melting point at a high level compared with the PEN-based polyester constituting the 2nd layer to be mentioned later. When the molar number of the ethylene 2,6-naphthalenedicarboxylate component is smaller than 90 mol % of the repeating units, the melting point becomes too low to get a melting point difference from the PEN-based polyester constituting the 2nd layer and, as a result, it is difficult to apply a sufficient refractive index difference to the multilayer drawn film. Homopolyethylene 2,6-naphthalenedicarboxylate is especially preferable among the PEN-based polyesters to keep a high melting point.

Preferable examples of the copolymerizing component other than ethylene 2,6-naphthalenedicarboxylate component are acid components, e.g. other aromatic carboxylic acids such as isophthalic acid and 2,7-naphthalenedicarboxylic acid; aliphatic dicarboxylic acids such as adipic acid, azelaic acid, sebacic acid and decanedicarboxylic acid; and alicyclic dicarboxylic acids such as cyclohexanedicarboxylic acid; and glycol components, e.g. aliphatic diols such as butanediol and hexanediol and alicyclic diols such as cyclohexanedimethanol.

The melting point of the resin constituting the PEN-based 1st layer is preferably between 260° C. and 270° C. to keep a relatively large melting point difference from the resin constituting the PEN-based 2nd layer to be mentioned later. When the melting point of the resin constituting the 1st layer is lower than the lower limit, the melting point difference from the resin constituting the 2nd layer becomes too small and the application of a sufficient refractive index difference to the produced multilayer drawn film becomes difficult. The melting point of a polyethylene 2,6-naphthalenedicarboxylate free from copolymerized unit is usually 267° C. or thereabout.

The 2nd Layer of the PET-Based Resin

In the present invention, the resin constituting the 2nd layer is preferably a polyester containing ethylene terephthalate component as a main repeating unit. The polyester is especially preferably a crystalline polyester from the viewpoint of the film-forming property in biaxial drawing. The polyester is a copolymerized polyethylene terephthalate composed of ethylene terephthalate component accounting for 75 to 97 mol % of the repeating unit and other copolymerized component accounting for 3 to 25 mol % to lower the melting point of the polyester relative to the aforementioned PET-based polyester constituting the 1st layer. When the molar number of the ethylene terephthalate component is lower than 75 mol % of the repeating unit or the molar number of the copolymerized component exceeds 25 mol %, the polymer becomes essentially amorphous to deteriorate the film-forming property in the biaxial drawing process, form a large discrepancy of composition from the polyester constituting the aforementioned PET-based 1st layer and liable to cause the lowering of the adhesivity between layers. On the other hand, when the molar number of the ethylene terephthalate component exceeds 97 mol % of the repeating unit or the molar number of the copolymerized component is smaller than 3 mol %, the melting point difference between the polymer and the polyester constituting the aforementioned PET-based 1st layer becomes too small to impart the multilayer drawn film with sufficient reflectance.

Preferable examples of the copolymerizing component other than ethylene terephthalate component are acid components, e.g. other aromatic carboxylic acids such as isophthalic acid, 2,6-naphthalenedicarboxylic acid and 2,7-naphthalenedicarboxylic acid; aliphatic dicarboxylic acids such as adipic acid, azelaic acid, sebacic acid and decanedicarboxylic acid; and alicyclic dicarboxylic acids such as cyclohexanedicarboxylic acid; and glycol components, e.g. aliphatic diols such as butanediol and hexanediol and alicyclic diols such as cyclohexanedimethanol. 2,6-Naphthalenedicarboxylic acid and isophthalic acid are preferable among the above examples because these acids can relatively easily lower the melting point while keeping the drawability.

The melting point of the resin constituting the PET-based 2nd layer is preferably between 200° C. and 245° C. to keep a relatively large melting point difference from the aforementioned resin constituting the PET-based 1st layer. When the melting point of the resin constituting the 2nd layer is higher than the higher limit, the melting point difference from the resin constituting the 1st layer becomes too small and the application of a sufficient refractive index difference to the produced multilayer drawn film becomes difficult. On the other hand, when the melting point of the resin constituting the 2nd layer is lower than the lower limit, the composition of the resin becomes considerably different from that of the resin constituting the 1st layer to hinder the impartment of the obtained biaxially drawn multilayer laminated film with sufficient adhesivity between layers. The melting point of the resin constituting the 2nd layer is not necessarily low before the film-forming process provided that the melting point becomes low after the drawing process. It will be easily understood, for example, that the resin may be the one produced by preparing a homopolyethylene terephthalate and other polyester and carrying out the transesterification reaction of the polymers in a melt kneading stage.

The 2nd Layer of the PEN-Based Resin

A polyester composed of ethylene 2,6-naphthalenedicarboxylate component as a main repeating unit is also preferable in the present invention as the resin constituting the 2nd layer. The polyester is especially preferably a crystalline polyester from the viewpoint of the film-forming property in biaxial drawing. The polyester is a copolymerized polyethylene 2,6-naphthalenedicarboxylate composed of ethylene 2,6-naphthalenedicarboxylate component accounting for 75 to 97 mol % of the repeating unit and other copolymerized component accounting for 3 to 25 mol % to lower the melting point of the polyester relative to the aforementioned PEN-based polyester constituting the 1st layer. When the molar number of the ethylene 2,6-naphthalenedicarboxylate component is lower than 75 mol % of the repeating unit or the molar number of the copolymerized component exceeds 25 mol %, the polymer becomes essentially amorphous to deteriorate the film-forming property in the biaxial drawing process, form a large discrepancy of composition from the polyester constituting the aforementioned 1st layer and liable to cause the lowering of the adhesivity between layers. On the other hand, when the molar number of the ethylene 2,6-naphthalenedicarboxylate component exceeds 97 mol % of the repeating unit or the molar number of the copolymerized component is smaller than 3 mol %, the melting point difference between the polymer and the polyester constituting the aforementioned 1st layer becomes too small to impart the multilayer drawn film with sufficient reflectance.

Preferable examples of the copolymerizing component other than ethylene 2,6-naphthalenedicarboxylate component are acid components, e.g. other aromatic carboxylic acids such as isophthalic acid and 2,7-naphthalenedicarboxylic acid; aliphatic dicarboxylic acids such as adipic acid, azelaic acid, sebacic acid and decanedicarboxylic acid; and alicyclic dicarboxylic acids such as cyclohexanedicarboxylic acid; and glycol components, e.g. aliphatic diols such as butanediol and hexanediol and alicyclic diols such as cyclohexanedimethanol. Terephthalic acid and isophthalic acid are preferable among the above examples because these acids can relatively easily lower the melting point while keeping the drawability.

The melting point of the resin constituting the PEN-based 2nd layer is preferably between 215° C. and 255° C. to keep a relatively large melting point difference from the aforementioned resin constituting the PEN-based 1st layer. When the melting point of the resin constituting the 2nd layer is higher than the higher limit, the melting point difference from the resin constituting the 1st layer becomes too small and the application of a sufficient refractive index difference to the produced multilayer drawn film becomes difficult. On the other hand, when the melting point of the resin constituting the 2nd layer is lower than the lower limit, the composition of the resin becomes considerably different from that of the resin constituting the 1st layer to hinder the impartment of the obtained biaxially drawn multilayer laminated film with sufficient adhesivity between layers. The melting point of the resin constituting the 2nd layer is not necessarily low before the film-forming process provided that the melting point becomes low after the drawing process. It will be easily understood, for example, that the resin may be the one produced by preparing a homopolyethylene 2,6-naphthalenedicarboxylate and other polyester and carrying out the transesterification reaction of the polymers in a melt kneading stage.

The biaxially drawn multilayer laminated film of the present invention is composed of the aforementioned 1st and 2nd layers alternately laminated one upon another at a total layer number of 11 or more. The biaxially drawn multilayer laminated film of the present invention is required to be drawn in two directions as mentioned above to attain a sufficient mechanical strength.

Especially, it is preferable that both of the 1st and the 2nd layers of the biaxially drawn multilayer laminated film of the present invention have crystalline nature and the resin of the 2nd layer is at least partly melted after drawing to attain the interlaminar adhesivity and the film-forming property in biaxial drawing. The biaxially drawn multilayer laminated film obtained by the method preferably has two or more melting points determined by differential scanning calorimetry (DSC) instrument and these melting points are separated from each other by 5° C. or more. It will be easily deduced that the higher melting point determined by the method is that of the 1st layer having high refractive index and the lower melting point is that of the 2nd layer exhibiting low refractive index.

In the aforementioned combination of the PET-based 1st layer and 2nd layer, the crystallization peak measured by the DSC instrument is preferably in the range of 100° C. and 190° C. to keep the 2nd layer in an at least partly melted state after drawing. When the crystallization peak temperature is lower than 100° C., one of the layers quickly crystallizes in the drawing of the film to frequently lower the film-forming property in the film-forming process and lower the uniformity of the film and, as a result, sometimes causes the mottling of the color. On the other hand, when the crystallization peak temperature exceeds 190° C., the crystallization takes place at the same time in the melting of the 2nd layer in the heat-stetting step and the development of a sufficient refractive index difference becomes difficult.

Accordingly, the biaxially drawn multilayer laminated film of the present invention having uniform film quality can be produced by drawing the resin of the 1st layer and the resin of the 2nd layer both having crystalline nature and the interlaminar adhesivity and the reflectance can be improved at the same time by melting the 2nd layer after the drawing process. Consequently, the biaxially drawn multilayer laminated film of the present invention composed of a combination of the PET-based 1st and 2nd layers preferably has a crystallization peak at 100° C. to 190° C. by a DSC instrument and two or more melting peaks having a melting point difference of 5° C. or over.

In the case of the combination of the aforementioned PEN-based 1st and 2nd layers, the crystallization peak measured by the DSC instrument is preferably in the range of 150° C. and 220° C. to keep the 2nd layer in an at least partly melted state after drawing. When the crystallization peak temperature is lower than 150° C., one of the layers quickly crystallizes in the drawing of the film to frequently lower the film-forming property in the film-forming process and lower the uniformity of the film and, as a result, sometimes causes the mottling of the color. On the other hand, when the crystallization peak temperature exceeds 220° C., the crystallization takes place at the same time in the melting of the 2nd layer in the heat-stetting step and the development of a sufficient refractive index difference becomes difficult.

Accordingly, the biaxially drawn multilayer laminated film of the present invention having uniform film quality can be produced by drawing the resin of the 1st layer and the resin of the 2nd layer both having crystalline nature and the interlaminar adhesivity and the reflectance can be improved at the same time by melting the 2nd layer after the drawing process. Consequently, the biaxially drawn multilayer laminated film of the present invention preferably has a combination of the PEN-based 1st and 2nd layers to present a crystallization peak at 150° C. to 220° C. by differential scanning calorimetry and two or more melting peaks having a melting point difference of 5° C. or over.

The breaking strength of the biaxially drawn multilayer laminated film of the present invention in the drawn directions is preferably 50 MPa or over in the continuous film-forming direction (longitudinal direction) as well as the direction perpendicular thereto (lateral direction), more preferably 100 MPa or over, further preferably 150 MPa or over and especially preferably 200 MPa or over. When the breaking strength is lower than 50 MPa, the handleability of the multilayer drawn film in processing is lowered or the durability of the product is lowered. The film having breaking strength of 50 MPa or above has other advantages of the increased stiffness of the film to improve the windability. The breaking strength of the film can be set to 50 MPa or over by the combination of the aforementioned PET-based 1st and 2nd layers. The breaking strength is further increased to 100 MPa or over by the combination of the aforementioned PEN-based 1st and 2nd layers.

The breaking strength ratio of the longitudinal direction to the lateral direction is preferably 3 or smaller to sufficiently keep the tear strength. The strength ratio of the longitudinal direction to the lateral direction is especially preferably 2 or smaller to further improve the tear strength. There is no particular restriction on the upper limit of the breaking strength, however, it is preferably up to 500 MPa to keep the stability in the drawing process.

The biaxially drawn multilayer laminated film of the present invention has the characteristic feature of high thermal dimensional stability in the combination of the aforementioned PET-based 1st layer and 2nd layer. The preferable thermal dimensional stability is a thermal shrinkage of 3.0% or below in both drawn directions (film-forming direction and lateral direction) measured after the heat-treatment at 150° C. for 30 minutes. The thermal shrinkage is more preferably 2.5% or below, and further preferably 2.0% or below. The thermal shrinkage values of the biaxially drawn multilayer laminated film in the film-forming direction and the lateral direction are preferably 5.0% or below after the heat-treatment at 200° C. for 10 minutes, more preferably 4.0% or below and further preferably 3.0% or below. The biaxially drawn multilayer laminated film of the present invention has excellent processing suitability such as lamination with a PVC sheet and embossing process by its high thermal dimensional stability.

The biaxially drawn multilayer laminated film of the present invention has further high thermal dimensional stability in the combination of the aforementioned PEN-based 1st layer and 2nd layer. It is sufficiently usable above all in a forming process necessitating a temperature of as high as 160° C. or above. The preferable thermal shrinkage in the combination of the PEN-based layers is preferably 2.0% or below in both drawn directions (film-forming direction and lateral direction) measured after the heat-treatment at 150° C. for 30 minutes. The thermal shrinkage is more preferably 1.5% or below, and further preferably 1.0% or below. The thermal shrinkage values of the biaxially drawn multilayer laminated film in the film-forming direction and the lateral direction are preferably 3.0% or below after the heat-treatment at 200° C. for 10 minutes, more preferably 2.0% or below and further preferably 1.5% or below.

Both of the resins constituting the 1st layer and the 2nd layer of the biaxially drawn multilayer laminated film of the present invention are preferably crystalline resins. When both of the resins constituting the 1st layer and the 2nd layer are crystalline resins, the non-uniformity trouble scarcely occurs in the processing such as drawing to reduce the unevenness of the thickness of the film. The range of the unevenness of thickness is preferably smaller than 5 μm in terms of the difference between the maximum value and the minimum value of the film thickness in an area considering the area to exert optical influence. The unevenness range is more preferably 3 μm or smaller, further preferably 1.5 μm or smaller. When the variation of the film thickness is 5 μm or larger, the color of the reflecting light changes to develop a color mottle.

The biaxially drawn multilayer laminated film of the present invention preferably contains inert particles having an average particle diameter of from 0.01 μm to 2 μm in an amount of 0.001 wt. % to 0.5 wt. % based on the weight of the multilayer drawn film in at least one of the 1st layer and the 2nd layer to improve the windability of the film. When the average particle diameter of the inert particles is smaller than the lower limit or the content is smaller than the lower limit, the effect for improving the windability of the multilayer drawn film is liable to be insufficient and, on the contrary, when the content of the inert particles exceeds the upper limit or the average particle diameter exceeds the upper limit, the deterioration of the optical characteristics of the multilayer drawn film becomes remarkable. The preferable average particle diameter of the inert particles is 0.05 to 1 μm, especially 0.1 to 0.3 μm, and the preferable content of the inert particles is 0.005-0.2 wt. %.

Examples of the inert particles to be included in the biaxially drawn multilayer laminated film are inorganic inert particles such as silica, alumina, calcium carbonate, calcium phosphate, kaolin and talc, and organic inert particles such as silicone, crosslinked polystyrene and styrene-divinylbenzene copolymer. These inert particles are preferably spherical particles having a major diameter to minor diameter ratio of 1.2 or below, especially 1.1 or below (hereinafter sometimes called as truly spherical particles) to keep the slipperiness and the optical characteristics of the film at high levels. The inert particles preferably have a sharp particle size distribution, for example, represented by a relative standard deviation of smaller than 0.3, further preferably smaller than 0.2. The use of particles having large relative standard deviation increases the inclusion frequency of coarse particles in the film and sometimes causes optical defects. The average particle diameter, the diameter ratio and the relative standard deviation of the inert particles are determined by sputtering a metal on the particle surface to an extremely thin layer for imparting the electrical conductivity, photographing the image with an electron microscope at a magnification ratio of 10,000 to 30,000, measuring the major diameter, the minor diameter and the diameter corresponding to the circle having the same area from the photographed image and calculating from the following formulas.

Average diameter=(sum of the diameters of the particles corresponding to the diameter of the circle having the same area)/(the number of measured particles)

Particle diameter ratio=(Average major diameter of a particle)/(average minor diameter of the particle)

Coating Layer

For example, in the case that the inert particle is not used in the biaxially drawn multilayer laminated film of the present invention, it is preferable to apply a slippery coating layer on at least one surface of the film in the processing stage of the biaxially drawn film. The composition constituting the coating layer is preferably incorporated with a lubricant (filler or wax) to impart the polyester resin composition or the acrylic resin composition with slipperiness. The addition of the lubricant is effective for further improving the slipperiness and antiblocking property.

The polyester resin to be used in the coating layer has a glass transition point (Tg) of preferably 50 to 100° C., more preferably 60 to 90° C. The polyester resin is preferably a water-soluble or dispersible polyester, however, it may contain an organic solvent to some extent.

Preferable examples of the polyester resin for the coating layer are those composed of the following polybasic acid or its ester-forming derivative and a polyol or its ester-forming derivative. The polybasic acid component is terephthalic acid, isophthalic acid, phthalic acid, phthalic anhydride, 2,6-naphthalenedicarboxylic acid, 1,4-cyclohexanedicarboxylic acid, adipic acid, sebacic acid, trimellitic acid, pyromellitic acid, dimer acid, 5-sodium sulfoisophthalic acid, etc. A copolymerized polyester resin is synthesized by using two or more kinds of these acid components. The polyester may contain a small amount of an unsaturated polybasic acid component such as maleic acid and itaconic acid and a hydroxycarboxylic acid such as p-hydroxybenzoic acid. The polyol component is ethylene glycol, 1,4-butanediol, diethylene glycol, dipropylene glycol, 1,6-hexanediol, 1,4-cyclohexanedimethanol, xylene glycol, dimethylol propane, poly(ethylene oxide) glycol, poly(tetramethylene oxide) glycol, etc. The monomer to be used in the polyester is not restricted by the above monomers.

The acrylic resin of the coating layer has a glass transition point (Tg) of preferably between −50° C. and +50° C., more preferably between −50° C. and +25° C. The acrylic resin is preferably a water-soluble or dispersible acrylic resin, however, it may contain an organic solvent to some extent. The acrylic resin can be produced by copolymerizing the following acrylic monomers. The acrylic monomers are alkyl acrylate, alkyl methacrylate (the alkyl group is methyl group, ethyl group, n-propyl group, isopropyl group, n-butyl group, isobutyl group, t-butyl group, 2-ethylhexyl group, cyclohexyl group, etc.); hydroxy-containing monomers such as 2-hydroxyethyl acrylate, 2-hydroxyethyl methacrylate, 2-hydroxypropyl acrylate and 2-hydroxypropyl methacrylate; epoxy-containing monomers such as glycidyl acrylate, glycidyl methacrylate and allyl glycidyl ether; monomers containing carboxy group or its salt such as acrylic acid, methacrylic acid, itaconic acid, maleic acid, fumaric acid, crotonic acid, styrenesulfoniic acid and their salts (sodium salt, potassium salt, ammonium salt, tertiary amine salt, etc.); monomers containing amide group such as acrylamide, methacrylamide, N-alkylacrylamide, N-alkylmethacrylamide, N,N-dialkylacrylamide and N,N-dialkylmethacrylamide (the alkyl group is methyl group, ethyl group, n-propyl group, isopropyl group, n-butyl group, isobutyl group, t-butyl group, 2-ethylhexyl group, cyclohexyl group, etc.), N-alkoxyacrylamide, N-alkoxymethacrylamide, N,N-dialkoxyacrylamide and N,N-dialkoxymethacrylamide (the alkoxy group is methoxy group, ethoxy group, butoxy group, isobutoxy group, etc.), acryloyl morpholine, N-methylol acrylamide, N-methylol methacrylamide, N-phenyl acrylamide and N-phenyl methacrylamide; acid anhydride monomers such as maleic anhydride and itaconic anhydride; and monomers such as vinyl isocyanate, allyl isocyanate, styrene, α-methylstyrene, vinyl methyl ether, vinyl ethyl ether, vinyltrialkoxysilane, alkyl maleic acid monoester, alkyl fumaric acid monoester, alkyl itaconic acid monoester, acrylonitrile, methacrylonitrile, vinylidene chloride, ethylene, propylene, vinyl chloride, vinyl acetate and butadiene. The monomer to be used in the acrylic resin is not restricted to the monomers cited above.

Conventional slip agents for polyester films can be used as the slipperiness-imparting agent to be added to the coating film layer. Examples of the agents are calcium carbonate particles, calcium oxide particles, aluminum oxide particles, kaolin particles, silicon oxide particles, zinc oxide particles, carbon black particles, silicon carbide particles, tin oxide particles, crosslinked acrylic resin particles, crosslinked polystyrene resin particles, melamine resin particles and crosslinked silicone resin particles. Especially preferable slip agents are silicon oxide particles, crosslinked acrylic resin particles, crosslinked polystyrene resin particles, etc., from the viewpoint of e.g. the dispersibility in the coating layer.

The coating liquid for forming the coating film is preferably used in the form of an aqueous coating liquid such as aqueous solution, dispersion or emulsion. For forming a coating film, the coating liquid may be incorporated as necessary with resins other than the above-mentioned compositions such as polymers having oxazoline group, crosslinking agents such as melamine, epoxy compound and aziridine, antistatic agents, colorants, surfactants, ultraviolet absorbers and lubricants (fillers and waxes). The solid concentration of the aqueous coating liquid is usually 20 wt. % or below, preferably 1 to 10 wt. %. When the concentration is below 1 wt. %, the applicability to a polyester film is lowered and, when it exceeds 20 wt. %, the stability of the coating liquid and the coated appearance are sometimes deteriorated.

The aqueous coating liquid can be applied to a film at an arbitrary stage, however, it is preferable to perform in the production step of the biaxially drawn multilayer laminated film, more preferably to a film before the completion of the orientation and crystallization of the film. The film before the completion of the orientation and crystallization includes an undrawn film, a uniaxially oriented film produced by drawing an undrawn film in longitudinal or lateral direction, a film produced by drawing and orienting a film in both longitudinal and lateral directions at low draw ratios (a biaxially drawn film before completing the orientation and crystallization by the redrawing in longitudinal or lateral direction), etc. Especially preferable method among the above examples comprises the application of the aqueous coating liquid of the above composition to an undrawn film or a uniaxially drawn film oriented in one direction followed by the longitudinal drawing and/or lateral drawing and the heat-setting of the coated product.

It is preferable, in the case of coating a film with an aqueous coating liquid, to apply a physical treatment such as corona surface-treatment, flame treatment and plasma treatment to the film surface or apply the coating composition in combination with a surfactant chemically inert to the composition to improve the coating suitability of the film. The surfactant promotes the wetting of the polyester film with the aqueous coating liquid and the examples of the surfactants are anionic or nonionic surfactants such as polyoxyethylene alkyl phenyl ether, polyoxyethylene-fatty acid ester, sorbitan fatty acid ester, glycerol fatty acid ester, fatty acid metal soap, alkylsulfuric acid salt, alkylsulfonic acid salt and alkylsulfosuccinic acid salt. The content of the surfactant in the composition for forming a coating film is preferably 1 to 10 wt. %.

The amount of the coating liquid is preferably selected to give a coating film thickness of 0.02 to 0.3 μm, preferably 0.07 to 0.25 μm. Too thin film thickness causes deficient adhesive force and excessively thick coating film may cause the blocking phenomenon or the increase of the haze value.

Any known coating method can be used in the application of the coating liquid. For example, a roll coating method, a gravure coating method, a roll brush method, a spray coating method, an air knife coating method, an impregnation method, a curtain coating method, etc., are used singly or in combination. The coating film is applied to one surface or both surfaces of the film according to need.

The biaxially drawn multilayer laminated film of the present invention preferably has uniform thickness distribution to selectively reflect the light of a specific wavelength band. The thickness uniformity requirement is fulfilled by the uniform thickness distribution of only the 1st layer and the uniform thickness distribution of only the 2nd layer, and the thickness of the 1st layer may be different from that of the 2nd layer. In the case of using the film e.g. as a reflection mirror or a metallic luster film, the laminated film preferably reflects the whole wavelength range of visible light not restricted to the light of a specific wavelength range. It is preferable in these cases to use a biaxially drawn multilayer laminated film produced by laminating a plurality of the biaxially drawn multilayer laminated films of the present invention having different reflecting light wavelength ranges or use a laminated film wherein the 1st and the 2nd layers have gradually varying thicknesses. It will be easily understood that these cases are also included in the biaxially drawn multilayer laminated film of the present invention.

The biaxially drawn multilayer laminated film of the present invention preferably has a haze value of 10% or below. When the haze exceeds 10% by the light scattering with inert particles, etc., the film becomes whitish as a whole and the luster is lost.

Method for Producing a Biaxially Drawn Multilayer Laminated Film

The biaxially drawn multilayer laminated film of the present invention is produced by forming a multilayer undrawn film, drawing the undrawn film and heat-setting the product.

A multilayer undrawn film composed of a combination of PET-based 1st layer and 2nd layer can be formed by the following method. A polyester (for the 1st layer) containing ethylene terephthalate component as a main repeating unit and having a melting point of 250 to 260° C. and a polyester (for the 2nd layer) containing ethylene terephthalate component as a main repeating unit and having a melting point lower than that of the 1st layer by at least 10° C. after the drawing treatment are extruded in molten state in a form alternately laminated to not less than 11 layers to obtain an extruded multilayer undrawn film (step to form a sheet). The polyesters constituting the 1st layer and the 2nd layer are same as those explained in the sections of the PET-based 1st layer and the PET-based 2nd layer.

When the melting point of the polyester for the 1st layer is lower than 250° C., sufficient melting point difference between the 1st layer polyester and the polyester for the 2nd layer becomes unattainable and, consequently, a sufficient refractive index difference cannot be applied between the layers of the obtained multilayer drawn film. Since the melting point of a homopolyethylene terephthalate is 256° C. or thereabout, the upper limit of the melting point of the polyester for the 1st layer is at most about 260° C. When the melting point of the polyester for the 2nd layer is not lower than that of the polyester for the 1st layer by 15° C. or over, the melting point difference between the 1st layer polyester and the 2nd layer polyester becomes insufficient resulting in the failure in getting a sufficient refractive index difference between the layers of the obtained multilayer drawn film. The upper limit of the melting point difference between the polyester for the 1st layer and the polyester for the 2nd layer is at most 50° C. for keeping the adhesivity of both layers.

A multilayer undrawn film composed of a combination of PEN-based 1st layer and 2nd layer can be formed by the following method. A polyester (for the 1st layer) containing ethylene 2,6-naphthalenedicarboxylate component as a main repeating unit and having a melting point of 260 to 270° C. and a polyester (for the 2nd layer) containing ethylene 2,6-naphthalenedicarboxylate component as a main repeating unit and having a melting point lower than that of the 1st layer by at least 10° C. after the drawing treatment are extruded in molten state in a form alternately laminated to not less than 11 layers to obtain an extruded multilayer undrawn film (step to form a sheet). The polyesters constituting the 1st layer and the 2nd layer are same as those explained in the sections of the PEN-based 1st layer and the PEN-based 2nd layer.

When the melting point of the polyester for the 1st layer is lower than 260° C. sufficient melting point difference between the 1st layer polyester and the polyester for the 2nd layer becomes unattainable and, consequently, a sufficient refractive index difference cannot be applied between the layers of the obtained multilayer drawn film. Since the melting point of a homopolyethylene 2,6-naphthalenedicarboxylate is 267° C. or thereabout, the upper limit of the melting point of the polyester for the 1st layer is at most about 270° C. When the melting point of the polyester for the 2nd layer is not lower than that of the polyester for the 1st layer by 15° C. or over, the melting point difference between the 1st layer polyester and the 2nd layer polyester becomes insufficient resulting in the failure in getting a sufficient refractive index difference between the layers of the obtained multilayer drawn film. The upper limit of the melting point difference between the polyester for the 1st layer and the polyester for the 2nd layer is at most 50° C. for keeping the adhesivity of both layers.

The multilayer undrawn film produced by the above method is drawn in two directions (along the film surface), i.e. the film-forming direction and the lateral direction perpendicular to the film-forming direction. The drawing temperature is preferably between the glass transition point (Tg) of the polyester of the 1st layer and Tg+50° C. The areal draw ratio is preferably from 5 to 50. Higher draw ratio is preferable because the unevenness of each of the 1st and 2nd layers in the plane direction is decreased according to the thinning of the film by drawing or the light interference of the multilayer drawn film becomes uniform in the plane direction. The method for drawing in two directions may be a consecutive biaxial drawing or a simultaneous biaxial drawing.

The most important characteristic of the present invention is the heat-treatment of the multilayer film drawn by the above means within a temperature range between a temperature lower than the melting point of the polyester for the 2nd layer by 10° C. and a temperature lower than the melting point of the polyester for the 1st layer by 15° C. to relax the orientation of the molecular chains in the 2nd layer and lower the refractive index of the 2nd layer. When the heat-setting temperature is lower than the melting point of the 2nd layer by a temperature exceeding 10° C., the effect to relax the orientation of the molecular chains in the 2nd layer to lower the refractive index becomes insufficient and a sufficient refractive index difference cannot be applied to the produced multilayer drawn film. On the contrary, when the heat-treatment temperature is not lower than the melting point of the polyester for the 1st layer by 10° C. or over, the orientation of the molecular chains in the 1st layer is also relaxed to lower the refractive index and a sufficient refractive index difference cannot be applied to the produced multilayer drawn film. The preferable heat-treatment temperature is from a temperature lower than the melting point of the polyester for the 2nd layer by 6° C. to a temperature lower than the melting point of the polyester for the 1st layer by 16° C., more preferably from a temperature lower than the melting point of the polyester for the 2nd layer by 2° C. to a temperature lower than the melting point of the polyester for the 1st layer by 18° C. The heat-treatment time is preferably 1 to 60 seconds.

The refractive index of the 2nd layer can be controlled without varying the composition of the resin by varying the heat-treatment temperature and time, in other words, the reflection characteristics of the multilayer drawn film can be varied without varying the composition of the resin.

Evaluation Methods

The physical properties and characteristics in the Examples to be described later were measured or evaluated by the following methods.

(1) Melting Point and Glass Transition Point (Tg) of the Polyester

Ten (10) mg of a polyester resin specimen was sampled and the melting point was measured by a differential scanning calorimeter (product of TA Instruments, DSC2920) at a heating rate of 20° C./min.

(2) Thickness of Each Layer

A film specimen was cut to a triangular form, fixed in an embedding capsule and embedded with an epoxy resin. The embedded specimen was sliced along the film-forming direction and the thickness direction with a microtome (UL-TRACUT-S; product of Reichert Inc.) to obtain thin slices having a thickness of 50 nm. The thin slice was observed and photographed with a transmission electron microscope (product of JEOL; JEM2010) at an acceleration voltage of 100 kV and the thickness of each layer was measured from the photograph.

(3) Melting Point and Crystallization Peak of the Film

Ten (10) mg of a specimen film was sampled and the crystallization temperature and the melting point were measured by a differential scanning calorimeter (product of TA Instruments; DSC2920) at a heating rate of 20° C./min.

(4) Reflectance and Reflection Wavelength

The relative specular reflectivity of the film relative to an aluminized mirror was measured at each wavelength in a wavelength range of 350 nm to 2,000 nm by a spectrophotometer (product of Shimadzu Corp.; MPC-3100). The largest reflectivity value was used as the maximum reflectance and the corresponding wavelength is used as the reflection wavelength.

(5) Total Light Transmittance and Haze

The total light transmittance $T_t$ (%) and the diffused light transmittance $T_d$ (%) were measured by using a haze meter (product of Nippon Denshoku Co.; NDH-20) in conformity to JIS K7105 and the haze (%) was calculated by the following formula.

$$\text{Haze (\%)} = (T_d/T_t) \times 100$$

(6) Breaking Strength

The breaking strength in the film-forming direction was measured by cutting a specimen film to 10 mm wide (lateral direction) and 150 mm long (film-forming direction), pulling the specimen by an Instron-type universal tensile tester at a chuck spacing of 100 mm, a pulling speed of 100 mm/min and a chart speed of 500 m/min and determining the breaking strength from the obtained load-elongation curve.

The breaking strength in the lateral direction was measured by a method similar to the measurement of the breaking strength in the film-forming direction except for the cutting of the film to 10 mm wide (film-forming direction) and 150 mm long (lateral direction).

(7) Thermal Shrinkage

The thermal shrinkage by the heat-treatment at 150° C. for 30 min was determined by holding a film in an oven set to 150° C. for 30 min in relaxed state, measuring the dimensional change after the heat treatment and calculating the thermal shrinkage by the following formula.

$$\text{Thermal shrinkage (\%)} = ((L0 \cdot L)/L0) \times 100$$

wherein L0 is the gauge length before heat-treatment and L is the gauge length after heat-treatment.

The thermal shrinkage by the heat-treatment at 200° C. for 10 min was determined by holding a film in an oven set to 200° C. for 10 min in relaxed state, measuring the dimensional change after the heat treatment and calculating the thermal shrinkage by the above formula.

(8) Variation Range of Thickness

A film specimen cut to a size of 1 m×1 m in the film-forming direction and the lateral direction was cut along longitudinal direction and lateral direction to obtain 25 pieces each having a width of 2 cm, and the thickness of each piece was continuously measured by using an electronic micrometer and a recorder (K-312A, K310B; product of Anritsu Ltd.). The measured points were divided into groups of 200 mm long, the maximum value and the minimum value were read in each group and the difference was used as the variation range of thickness.

(9) Interlaminar Adhesivity

Adhesive tapes (product of Nichiban Co., Ltd.; commercial name, Cellotape) of 24 mm wide and 100 mm long were bonded to both surfaces of a specimen film (10 mm×50 mm) and peeled at a peeling angle of 180° and the peeled surface was observed. The procedures were carried out on 10 specimens and the number of specimens having interlaminar peeling was counted.

(10) Color Shading

Ten (10) A-4 size specimen films were prepared. Each specimen film was overlapped on a white plain paper and the color shading of transmission color in the specimen film was visually evaluated under an illumination of 30 Lux. Separately, ten (10) A-4 size specimen films were prepared, the back surface of each specimen was colored with a black spray and the color shading of reflection color in the specimen film was visually evaluated under an illumination of 30 Lux.

The color shading results of the transmission color and reflection color were collectively judged by the following evaluation criterion.

○: No color shading is observable in the specimen.

Δ: Areas having different color are observable on a part of the specimen.

X: Color shading is clearly observable as spots or streaks.

Example 1

A polyethylene terephthalate having an intrinsic viscosity of 0.63 (in o-chlorophenol at 35° C.) (described as "PET" in the Table 1) was used as the polyester for the 1st layer and a copolymerized polyethylene terephthalate copolymerized with 12 mol % isophthalic acid and having an intrinsic viscosity of 0.61 (in o-chlorophenol at 35° C.) (described as "IA12PET" in the Table 1) was incorporated with 0.10 wt. % truly spherical silica particles (average particle diameter: 1.5 μm, major diameter to minor diameter ratio: 1.02, average deviation of particle diameter: 0.1) (described as "a" in the Table 1.) and the product was used as the polyester for the 2nd layer. The polyester for the 1st layer and the polyester for the 2nd layer were dried at 170° C. for 3 hours, supplied to respective extruders and melted by heating at 280° C. The polyester for the 1st layer was branched to 101 layers and the polyester for the 2nd layer was branched to 100 layers, the branched 1st layers and 2nd layers were alternately laminated by using a multilayer feed block apparatus, guided to a die while keeping the laminated state, and cast on a casting drum to obtain an undrawn multilayer laminated film having a total layer number of 201 and composed of alternately laminated 1st layers and 2nd layers each having the same thickness. The extrusion rates of the 1st layer and the 2nd layer were adjusted to 1:1 and the lamination was carried out to place the 1st layer at both surfaces. The multilayer undrawn film was drawn in the film-forming direction at 90° C. at a draw ratio of 3.6 and then drawn in lateral direction at 95° C. at a draw ratio of 3.9 and the product was subjected to heat-setting treatment at 230° C. for 3 seconds.

The physical properties of the obtained biaxially drawn multilayer laminated film are shown in the Table 2.

Examples 2, 3 and 5 to 7

The operations of the Example 1 were repeated except for the change of the polyester for the 2nd layer and the production conditions to those described in the Table 1. The term "IA8PET" described in the Table 1 as the kind of the resin of each layer is a polyethylene terephthalate copolymerized with 8 mol % isophthalic acid and having an intrinsic viscosity of 0.65 (in o-chlorophenol at 35° C.) and "IA20PET" is a polyethylene terephthalate copolymerized with 20 mol % isophthalic acid and having an intrinsic viscosity of 0.58 (in o-chlorophenol at 35° C.). The term "b" described in the Table 1 as the kind of the inert particle is bulk calcium carbonate (average particle diameter: 1.5 μm, major diameter to minor diameter ratio: 1.30, average deviation of particle diameter: 0.3) and the term (c) is truly spherical silicone particles (average particle diameter: 0.1 μm, major diameter to minor diameter ratio: 1.10, average deviation of particle diameter: 0.2).

The physical properties of the obtained multilayer drawn film are shown in the table 2.

Example 4

A polyethylene terephthalate having an intrinsic viscosity of 0.63 (in o-chlorophenol at 35° C.) (PET) was used as the polyester for the 1st layer and a copolymerized polyethylene terephthalate copolymerized with 10 mol % 2,6-naphthalenedicarboxylic acid and having an intrinsic viscosity of 0.70 (in o-chlorophenol at 35° C.) (described as "NDC10PET" in the Table 1) was prepared as the polyester for the 2nd layer. The polyester for the 1st layer and the polyester for the 2nd layer were dried at 170° C. for 3 hours, supplied to respective extruders and melted by heating at 280° C. The polyester for the 1st layer was branched to 101 layers and the polyester for the 2nd layer was branched to 100 layers, the branched 1st layers and 2nd layers were alternately laminated by using a multilayer feed block apparatus, guided to a die while keeping the laminated state, and cast on a casting drum to obtain an undrawn multilayer laminated film having a total layer number of 201 and composed of alternately laminated 1st layers and 2nd layers each having the same thickness. The lamination was carried out to place the 1st layer at both surfaces. The obtained multilayer undrawn film was drawn in the film-forming direction at 90° C. at a draw ratio of 3.6 and a water-based coating liquid composed of the following coating composition at a concentration of 1.6% was uniformly applied to one surface of the produced film with a roll coater to a dried thickness of 0.1 μm.

[Composition for Coating Film]

45 wt. % copolymerized polyester resin composed of an acid component consisting of 85 mol % terephthalic acid/13 mol % isophthalic acid/12 mol % 5-sodium sulfoisophthalic acid and a glycol component consisting of 80 mol % butylene glycol/20 mol % bisphenol A added with 2 mol of ethylene glycol:

35 wt. % acrylic resin consisting of 80 mol % methyl methacrylate/10 mol % ethyl acrylate/5 mol % N-methylol acrylamide/5 mol % 2-hydroxyethyl methacrylate:

15 wt. % lubricant composed of a methyl methacrylate-divinylbenzene copolymer and having an average particle diameter of 40 nm: and 5 wt. % surfactant composed of polyoxyethylene (n=7) lauryl ether.

The coating liquid composed of the above composition was applied and dried at 80° C., the coated film was drawn in lateral direction at 95° C. at a draw ratio of 3.9 and subjected to heat-setting treatment at 230° C. for 3 seconds.

The physical properties of the obtained biaxially drawn multilayer laminated film are shown in the Table 2.

Comparative Example 1

A polyethylene 2,6-naphthalenedicarboxylate having an intrinsic viscosity of 0.65 (in o-chlorophenol at 35° C.) (described as "PEN" in the Table 1) was added with 0.10 wt. % inert particles consisting of truly spherical silica particles (average particle diameter: 0.20 μm, major diameter to minor diameter ratio: 1.02, average deviation of particle diameter: 0.1) (described as "d" in the Table 1) and the product was used as the polyester for the 1st layer. A copolymerized polyethylene terephthalate (IA12PET) copolymerized with 12 mol % isophthalic acid and having an intrinsic viscosity of 0.61 (in o-chlorophenol at 35° C.) was prepared as the polyester for the 2nd layer. The polyester for the 1st layer and the polyester for the 2nd layer were dried at 170° C. for 5 hours, supplied to respective extruders and melted by heating at 300° C. The polyester for the 1st layer was branched to 101 layers and the polyester for the 2nd layer was branched to 100 layers, the branched 1st layers and 2nd layers were alternately laminated by using a multilayer feed block apparatus, guided to a die while keeping the laminated state, and cast on a casting drum to obtain an undrawn multilayer laminated film having a total layer number of 201 and composed of alternately laminated 1st layers and 2nd layers each having the same thickness. The extrusion rates of the 1st layer and the 2nd layer were adjusted to 1:1 and the lamination was carried out to place the 1st layer at both surfaces. The multilayer undrawn film was drawn in the film-forming direction at 110° C. at a draw ratio of 3.6 and then drawn in lateral direction at 115° C. at a draw ratio of 3.9 and the product was subjected to heat-setting treatment at 200° C. for 3 seconds.

The obtained film had remarkable color mottle defect and poor interlaminar peeling characteristics. The physical properties of the film are shown in the Table 2.

Comparative Examples 2 to 4

The operations similar to the Comparative Example 1 were repeated except for the change of the production conditions to those described in the Table 1. In the terms described in the Table 1 as the kind of the resin of each layer, "IA3PET" is a polyethylene terephthalate copolymerized with 3 mol % isophthalic acid and having an intrinsic viscosity of 0.65 (in o-chlorophenol at 35° C.). The films obtained by the Comparative Examples 2 and 3 had poor reflection characteristics. The film obtained by the Comparative Example 4 had remarkable color mottle defect and poor interlaminar peeling characteristics similar to the film of the Comparative Example 1. The physical properties of the films are shown in the Table 2.

TABLE 1

|  |  | 1st layer | | | | 2nd layer | | | | |
|---|---|---|---|---|---|---|---|---|---|---|
|  |  | Resin | | Inert particle | | Resin | | Inert particles | | |
|  |  |  |  | addition | | | | addition | | |
|  |  | kind | mp (° C.) | kind | amount (wt %) | No. of layers | kind | mp (° C.) | kind | amount (wt %) | No. of layers |
| Example | 1 | PET | 258 | — |  | 101 | IA12PET | 223 | a | 0.1 | 100 |
|  | 2 | PET | 258 | — |  | 101 | IA12PET | 223 | a | 0.1 | 100 |
|  | 3 | PET | 258 | — |  | 101 | IA12PET | 223 | a | 0.1 | 100 |
|  | 4 | PET | 258 | — |  | 101 | NDC10PET | 233 | — |  | 100 |
|  | 5 | PET | 258 | — |  | 151 | IA12PET | 234 | a | 0.01 | 150 |

TABLE 1-continued

|  |  |  |  |  |  |  |  |  |  |  |  |
|---|---|---|---|---|---|---|---|---|---|---|---|
|  | 6 | PET | 258 | — |  | 101 | IA8PET | 234 | b | 0.01 | 100 |
|  | 7 | PET | 258 | c | 0.2 | 101 | IA20PET | 204 | — |  | 100 |
| Comparative | 1 | PEN | 269 | d | 0.1 | 101 | IA12PET | 226 | — |  | 100 |
| Example | 2 | PET | 258 | — |  | 101 | IA3PET | 248 | d | 0.1 | 100 |
|  | 3 | PET | 258 | — |  | 101 | IA12PET | 226 | a | 0.1 | 100 |
|  | 4 | PEN | 269 | — |  | 101 | NDC10PET | 233 | — |  | 100 |

|  |  | Total No. of layers | Drawing | | | | Heat set temp (°C.) | Thickness | | |
|---|---|---|---|---|---|---|---|---|---|---|
|  |  |  | Film-forming direction | | Lateral direction | | | 1st layer (nm) | 2nd layer (nm) | total (μm) |
|  |  |  | draw ratio | temp (°C.) | draw ratio | temp (°C.) |  |  |  |  |
| Example | 1 | 201 | 3.6 | 90 | 3.9 | 95 | 230 | 65 | 63 | 13 |
|  | 2 | 201 | 3.6 | 90 | 3.9 | 95 | 230 | 80 | 80 | 16 |
|  | 3 | 201 | 3.6 | 90 | 3.9 | 95 | 230 | 95 | 95 | 19 |
|  | 4 | 201 | 3.8 | 90 | 4.1 | 95 | 230 | 140 | 140 | 28 |
|  | 5 | 301 | 3.6 | 90 | 4.1 | 95 | 230 | 90 | 90 | 27 |
|  | 6 | 201 | 3.6 | 90 | 4.1 | 95 | 230 | 80 | 80 | 16 |
|  | 7 | 201 | 3.6 | 90 | 4.0 | 95 | 230 | 80 | 90 | 17 |
| Comparative | 1 | 201 | 3.6 | 115 | 4.0 | 120 | 200 | 130 | 130 | 26 |
| Example | 2 | 201 | 3.6 | 90 | 3.9 | 95 | 215 | 80 | 80 | 16 |
|  | 3 | 201 | 3.6 | 90 | 3.9 | 95 | 190 | 80 | 80 | 16 |
|  | 4 | 201 | 3.6 | 90 | 3.9 | 95 | 190 | 95 | 90 | 19 |

TABLE 2

|  |  | DSC results | | | Optical properties | | | | Breaking strength Mpa | |
|---|---|---|---|---|---|---|---|---|---|---|
|  |  | Crystallization peak °C. | Low side mp. °C. | High side mp °C. | Max reflection wave length nm | Reflection peak height % | Total light transmittance % | Haze % | Film-forming direction | Lateral direction |
| Example | 1 | 121 | 237 | 247 | 460 | 66 | 91.1 | 1.5 | 102 | 115 |
|  | 2 | 121 | 237 | 246 | 550 | 65 | 62.4 | 2.3 | 104 | 113 |
|  | 3 | 121 | 238 | 246 | 630 | 72 | 77.5 | 2.5 | 103 | 116 |
|  | 4 | 133 | 237 | 246 | 958 | 76 | 89.5 | 0.5 | 108 | 110 |
|  | 5 | 122 | 237 | 246 | 590 | 70 | 72.0 | 2.4 | 100 | 98 |
|  | 6 | 135 | 240 | 247 | 553 | 54 | 65.0 | 2.1 | 132 | 138 |
|  | 7 | 110 | 222 | 245 | 577 | 71 | 63.4 | 2.1 | 78 | 83 |
| Comparative | 1 | — | 225 | 261 | 871 | 84 | 79.1 | 4.2 | 213 | 200 |
| Example | 2 | — | — | 263 | — | — | 89.5 | 1.5 | 210 | 230 |
|  | 3 | — | 237 | 246 | 562 | 3 | 89.3 | 6.2 | 314 | 295 |
|  | 4 | 120 | 224 | 265 | 621 | 84 | 54.2 | 8.3 | 194 | 202 |

|  |  | Heat shrinkage % | | | | Thickness variation μm | | Freq. of delamination | Color mottle |
|---|---|---|---|---|---|---|---|---|---|
|  |  | 150° C. × 30 min | | 200° C. × 10 min | | | | | |
|  |  | Film-forming direction | Lateral direction | Film-forming direction | Lateral direction | Film-forming direction | Lateral direction | | |
| Example | 1 | 1.3 | 0.4 | 1.9 | 1.7 | 1.1 | 0.7 | 0 | ○ |
|  | 2 | 1.2 | 0.4 | 2.0 | 1.9 | 0.6 | 0.9 | 0 | ○ |
|  | 3 | 1.3 | 0.5 | 1.9 | 1.9 | 1.2 | 1.3 | 0 | ○ |
|  | 4 | 1.1 | 0.6 | 2.0 | 2.1 | 1.1 | 0.9 | 0 | ○ |
|  | 5 | 1.2 | 0.9 | 2.1 | 2.2 | 1.2 | 1.0 | 0 | ○ |
|  | 6 | 1.5 | 1.0 | 2.8 | 2.8 | 0.8 | 0.7 | 0 | ○ |
|  | 7 | 1.8 | 1.0 | 2.1 | 2.2 | 2.0 | 1.8 | 0 | Δ |
| Comparative | 1 | 1.9 | 1.4 | 3.9 | 2.1 | 0.9 | 3.7 | 10 | X |
| Example | 2 | 1.2 | 1.0 | 3.1 | 3.2 | 1.2 | 0.7 | 0 | ○ |
|  | 3 | 7.3 | 10.0 | 10.5 | 13.0 | 0.6 | 1.1 | 0 | ○ |
|  | 4 | 2.6 | 2.0 | 4.5 | 3.2 | 2.6 | 6.4 | 10 | X |

Example 8

A polyethylene 2,6-naphthalenedicarboxylate having an intrinsic viscosity of 0.65 (in o-chlorophenol at 35° C.) (described as "PEN" in the Table 3) and containing 0.15 wt. % truly spherical silica particles (average particle diameter: 0.3 μm, major diameter to minor diameter ratio: 1.02, average deviation of particle diameter: 0.1) (described as "a" in the Table 3.) was used as the polyester for the 1st layer and a resin produced by blending a polyethylene 2,6-naphthalenedicarboxylate (PEN) having an intrinsic viscosity of 0.63 (in o-chlorophenol at 35° C.) with a polyethylene terephthalate (PET) having an intrinsic viscosity of 0.63 (in o-chlorophenol at 35° C.) at a weight ratio of 8:2 (described as "Brend-1" in the Table 3) was used as the polyester for the 2nd layer. The blended resin was transesterified by the kneading in melting to cause the melting point drop similar to the copolymerized resin. The melting point of the blended resin extruded under the condition of the Example was 235° C. The polyester for the 1st layer and the polyester for the 2nd layer were dried at 170° C. for 5 hours, supplied to respective extruders and melted by heating at 300° C. The polyester for the 1st layer was branched to 101 layers and the polyester for the 2nd layer was branched to 100 layers, the branched 1st layers and 2nd layers were alternately laminated by using a multilayer feed block apparatus, guided to a die while keeping the laminated state, and cast on a casting drum to obtain an undrawn multilayer laminated film having a total layer number of 201 and composed of alternately laminated 1st layers and 2nd layers each having the same thickness. The extrusion rates of the 1st layer and the 2nd layer were adjusted to 1:1 and the lamination was carried out to place the 1st layer at both surfaces. The multilayer undrawn film was drawn in the film-forming direction at 110° C. at a draw ratio of 3.6 and then drawn in lateral direction at 120° C. at a draw ratio of 3.9 and the product was subjected to heat-setting treatment at 245° C. for 3 seconds.

The physical properties of the obtained biaxially drawn multilayer laminated film are shown in the Table 4.

Examples 9, 10 and 12 to 14

The operations of the Example 8 were repeated except for the change of the polyester for the 2nd layer and the production conditions to those described in the Table 3. The term "TA12PEN" described in the Table as the kind of the resin of each layer is a polyethylene 2,6-naphthalenedicarboxylate copolymerized with 12 mol % terephthalic acid and having an intrinsic viscosity of 0.66 (in o-chlorophenol at 35° C.), "IA20PEN" is a polyethylene 2,6-naphthalenedicarboxylate copolymerized with 20 mol % isophthalic acid and having an intrinsic viscosity of 0.58 (in o-chlorophenol at 35° C.), and "IA11PEN" is a polyethylene 2,6-naphthalenedicarboxylate copolymerized with 11 mol % isophthalic acid and having an intrinsic viscosity of 0.67 (in o-chlorophenol at 35° C.). The term "b" described in the Table as the kind of the inert particle is bulk calcium carbonate (average particle diameter: 0.15 μm, major diameter to minor diameter ratio: 1.30, average deviation of particle diameter: 0.3) and the term (c) is truly spherical silicone particles (average particle diameter: 0.1 μm, major diameter to minor diameter ratio: 1.10, average deviation of particle diameter: 0.2).

The physical properties of the obtained multilayer drawn film are shown in the table 4.

Example 11

A polyethylene 2,6-naphthalenedicarboxylate having an intrinsic viscosity of 0.65 (in o-chlorophenol at 35° C.) (PEN) was used as the polyester for the 1st layer and a resin produced by blending a polyethylene 2,6-naphthalenedicarboxylate (PEN) having an intrinsic viscosity of 0.63 (in o-chlorophenol at 35° C.) with a polyethylene terephthalate (PET) having an intrinsic viscosity of 0.63 (in o-chlorophenol at 35° C.) at a weight ratio of 8:2 (Brend-1) was used as the polyester for the 2nd layer. The polyester for the 1st layer and the polyester for the 2nd layer were dried at 170° C. for 5 hours, supplied to respective extruders and melted by heating at 300° C. The polyester for the 1st layer was branched to 101 layers and the polyester for the 2nd layer was branched to 100 layers, the branched 1st layers and 2nd layers were alternately laminated by using a multilayer feed block apparatus, guided to a die while keeping the laminated state, and cast on a casting drum to obtain an undrawn multilayer laminated film having a total layer number of 201 and composed of alternately laminated 1st layers and 2nd layers each having the same thickness. The lamination was carried out to place the 1st layer at both surfaces. The obtained multilayer undrawn film was drawn in the film-forming direction at 110° C. at a draw ratio of 3.6 and a water-based coating liquid composed of the following coating composition at a concentration of 1.6% was uniformly applied to one surface of the produced film with a roll coater to a dried thickness of 0.1 μm.

[Composition for Coating Film]

45 wt. % copolymerized polyester resin composed of an acid component consisting of 85 mol % terephthalic acid/13 mol % isophthalic acid/12 mol % 5-sodium sulfoisophthalic acid and a glycol component consisting of 80 mol % butylene glycol/20 mol % bisphenol A added with 2 mol of ethylene glycol:

35 wt. % acrylic resin consisting of 80 mol % methyl methacrylate/10 mol % ethyl acrylate/5 mol % N-methylol acrylamide/5 mol % 2-hydroxyethyl methacrylate:

15 wt. % lubricant composed of a methyl methacrylate-divinylbenzene copolymer and having an average particle diameter of 40 nm: and 5 wt. % surfactant composed of polyoxyethylene (n=7) lauryl ether.

The coating liquid composed of the above composition was applied and dried at 105° C., the coated film was drawn in lateral direction at 120° C. at a draw ratio of 3.9 and subjected to heat-setting treatment at 245° C. for 3 seconds. The physical properties of the obtained biaxially drawn multilayer laminated film are shown in the Table 4.

Comparative Example 5

A polyethylene 2,6-naphthalenedicarboxylate (PEN) having an intrinsic viscosity of 0.65 (in o-chlorophenol at 35° C.) and free from inert particle was used as the polyester for the 1st layer and a polyethylene terephthalate (expressed by "IA2-PEN" in the Table 3) copolymerized with 2 mol % isophthalic acid, having an intrinsic viscosity of 0.63 (in o-chlorophenol at 35° C.) and free from inert particle was used as the polyester for the 2nd layer. The polyester for the 1st layer and the polyester for the 2nd layer were dried at 170° C. for 5 hours, supplied to respective extruders and melted by heating at 300° C. The polyester for the 1st layer was branched to 101 layers and the polyester for the 2nd layer was branched to 100 layers, the branched 1st layers and 2nd layers were alternately laminated by using a multilayer feed block apparatus, guided to a die while keeping the laminated state, and cast on a casting drum to obtain an undrawn multilayer laminated film having a total layer number of 201 and composed of alternately laminated 1st layers and 2nd layers each having the same thickness. The extrusion rates of the 1st layer and the 2nd layer were adjusted to 1:1 and the lamination was carried out to place the 1st layer at both surfaces. The obtained multilayer undrawn film was drawn in the film-forming direction at 115° C. at a draw ratio of 3.6 and subsequently drawn in lateral direction at 120° C. at a draw ratio of 3.9 and subjected to the heat-setting treatment at 240° C. for 3 sec.

The obtained multilayer drawn film had no particular reflection peak. The physical properties of the film are shown in the Table 4.

Comparative Examples 6 to 8

The operations of the Comparative Example 5 were repeated except for the change of the production conditions to those described in the Table 3. The term "NDC12PET" described in the Table 3 as the kind of the resin of each layer is a polyethylene terephthalate copolymerized with 12 mol % 2,6-naphthalenedicarboxylic acid and having an intrinsic viscosity of 0.70 (in o-chlorophenol at 35° C.), and the term "d" described in the Table as the kind of the inert particle is truly spherical silica particle (average particle diameter: 1.5 μm, major diameter to minor diameter ratio: 1.02, average deviation of particle diameter: 0.1).

The multilayer films obtained by the Comparative Examples 6 and 7 had reflection performance, however, the color mottles of these films were extremely poor. Further, the multilayer film obtained by the Comparative Example 8 had extremely small reflection peak and sufficient color development was unattainable. The results of the obtained multilayer films are shown in the Table 4.

TABLE 3

| | | 1st layer | | | | 2nd layer | | | | |
| | | Resin | | Inert particle addition | | Resin | | Inert particles addition | | |
| | | kind | mp (° C.) | kind | amount (wt %) | No. of layers | kind | mp (° C.) | kind | amount (wt %) | No. of layers |
|---|---|---|---|---|---|---|---|---|---|---|---|
| Example | 8 | PEN | 269 | a | 0.15 | 101 | Brend-1 | (235) | — | — | 100 |
| | 9 | PEN | 269 | a | 0.15 | 101 | Brend-1 | (235) | — | — | 100 |
| | 10 | PEN | 269 | a | 0.15 | 101 | Brend-1 | (235) | — | — | 100 |
| | 11 | PEN | 269 | — | — | 101 | Brend-1 | (235) | — | — | 100 |
| | 12 | PEN | 269 | a | 0.15 | 151 | TA12PEN | 232 | — | — | 150 |
| | 13 | PEN | 269 | — | — | 101 | IA20PEN | 207 | b | 0.2 | 100 |
| | 14 | PEN | 269 | — | — | 101 | IA11PEN | 236 | c | 0.2 | 100 |
| Comparative Example | 5 | PEN | 269 | — | — | 101 | IA2PEN | 261 | — | — | 100 |
| | 6 | PEN | 269 | — | — | 101 | IA11PET | 226 | d | 0.1 | 100 |
| | 7 | PEN | 269 | — | — | 101 | NDC12PET | 220 | d | 0.1 | 100 |
| | 8 | PEN | 269 | a | 0.15 | 101 | Brend-1 | — | — | — | 100 |

| | | | Drawing | | | | Heat set temp (° C.) | Thickness | | |
| | | Total No. of layers | Film-forming direction | | Lateral direction | | | 1st layer (nm) | 2nd layer (nm) | total (μm) |
| | | | draw ratio | temp (° C.) | draw ratio | temp (° C.) | | | | |
|---|---|---|---|---|---|---|---|---|---|---|
| Example | 8 | 201 | 3.6 | 110 | 3.9 | 120 | 245 | 65 | 63 | 13 |
| | 9 | 201 | 3.6 | 110 | 3.9 | 120 | 245 | 80 | 80 | 16 |
| | 10 | 201 | 3.6 | 110 | 3.9 | 120 | 245 | 95 | 95 | 19 |
| | 11 | 201 | 3.8 | 110 | 4.1 | 120 | 245 | 140 | 140 | 28 |
| | 12 | 301 | 3.6 | 120 | 4.1 | 125 | 240 | 90 | 90 | 27 |
| | 13 | 201 | 3.6 | 120 | 4.1 | 125 | 240 | 80 | 90 | 17 |
| | 14 | 201 | 3.6 | 120 | 4.0 | 125 | 240 | 150 | 150 | 30 |
| Comparative Example | 5 | 201 | 3.6 | 115 | 4.0 | 120 | 240 | 130 | 130 | 26 |
| | 6 | 201 | 3.6 | 110 | 3.9 | 120 | 215 | 80 | 80 | 16 |
| | 7 | 201 | 3.6 | 110 | 3.9 | 120 | 205 | 80 | 80 | 16 |
| | 8 | 201 | 3.6 | 110 | 3.9 | 120 | 200 | 95 | 90 | 19 |

TABLE 4

| | | DSC results | | | Optical properties | | | | Breaking strength Mpa | |
| | | Crystallization peak ° C. | Low side mp. ° C. | High side mp ° C. | Max reflection wave length nm | Reflection peak height % | Total light transmittance % | Haze % | Film-forming direction | Lateral direction |
|---|---|---|---|---|---|---|---|---|---|---|
| Example | 8 | 173 | 246 | 264 | 435 | 82 | 87.7 | 2.5 | 161 | 170 |
| | 9 | 173 | 246 | 263 | 544 | 82 | 40.2 | 7.3 | 161 | 172 |
| | 10 | 174 | 246 | 263 | 646 | 82 | 60.6 | 4.9 | 166 | 170 |

TABLE 4-continued

| | | | | | | | | | | |
|---|---|---|---|---|---|---|---|---|---|---|
| | 11 | 177 | 245 | 262 | 952 | 84 | 85.6 | 0.3 | 167 | 172 |
| | 12 | 171 | 241 | 264 | 612 | 84 | 62.0 | 5.2 | 172 | 178 |
| | 13 | 153 | 226 | 263 | 577 | 83 | 45.0 | 7.5 | 134 | 139 |
| | 14 | 170 | 238 | 266 | 1020 | 83 | 66.0 | 3.4 | 175 | 179 |
| Comparative Example | 5 | — | — | 263 | — | — | 88.0 | 2.3 | 254 | 259 |
| | 6 | 120 | 224 | 265 | 621 | 84 | 54.2 | 8.3 | 194 | 202 |
| | 7 | — | 225 | 261 | 871 | 84 | 79.1 | 4.2 | 213 | 200 |
| | 8 | — | 246 | 264 | 544 | 5 | 86.0 | 7.2 | 255 | 259 |

| | | Heat shrinkage % | | | | Thickness variation μm | | | |
|---|---|---|---|---|---|---|---|---|---|
| | | 150° C. × 30 min | | 200° C. × 10 min | | | | | |
| | | Film-forming direction | Lateral direction | Film-forming direction | Lateral direction | Film-forming direction | Lateral direction | Freq. of delamination | Color mottle |
| Example | 8 | 0.7 | 0.3 | 1.0 | 1.0 | 1.9 | 0.6 | 0 | ○ |
| | 9 | 0.7 | 0.3 | 1.0 | 1.0 | 1.2 | 0.4 | 0 | ○ |
| | 10 | 0.7 | 0.3 | 1.0 | 1.0 | 0.8 | 1.1 | 0 | ○ |
| | 11 | 0.7 | 0.3 | 1.6 | 1.0 | 2.3 | 1.3 | 0 | ○ |
| | 12 | 0.8 | 0.4 | 1.5 | 1.0 | 1.5 | 0.8 | 0 | ○ |
| | 13 | 1.2 | 0.5 | 2.3 | 1.3 | 2.9 | 2..5 | 2 | ○ |
| | 14 | 0.9 | 0.4 | 1.4 | 1.0 | 1.0 | 0.6 | 0 | ○ |
| Comparative Example | 5 | 0.4 | 0.1 | 2.0 | 1.0 | 1.3 | 0.5 | 0 | — |
| | 6 | 2.6 | 2.0 | 4.5 | 3.2 | 2.6 | 6.4 | 10 | X |
| | 7 | 1.9 | 1.4 | 3.9 | 2.1 | 0.9 | 3.7 | 10 | X |
| | 8 | 2.1 | 1.2 | 3.1 | 1.9 | 1.2 | 1.0 | 0 | ○ |

Example 15

A polyethylene 2,6-naphthalenedicarboxylate having an intrinsic viscosity of 0.65 (in o-chlorophenol at 35° C.) (described as "PEN" in the Table 5) and containing 0.15 wt. % truly spherical silica particles (average particle diameter: 0.3 μm, major diameter to minor diameter ratio: 1.02, average deviation of particle diameter: 0.1) (described as "a" in the Table 5) was used as the polyester for the 1st layer and a polyethylene terephthalate copolymerized with 10 mol % 2,6-naphthalenedicarboxylic acid and having an intrinsic viscosity of 0.61 (in o-chlorophenol at 35° C.) (NDC10PET) was used as the polyester for the 2nd layer. The polyester for the 1st layer was dried at 170° C. for 5 hours and the polyester for the 2nd layer was dried at 160° C. for 3 hours. The polyesters were supplied to respective extruders, the polyester for the 1st layer was melted by heating at 300° C. and the polyester for the 2nd layer was melted by heating at 280° C. The polyester for the 1st layer was branched to 101 layers and the polyester for the 2nd layer was branched to 100 layers, and the branched 1st layers and 2nd layers were alternately laminated by using a multilayer feed block apparatus, guided to a die while keeping the laminated state, and cast on a casting drum to obtain an undrawn multilayer laminated film having a total layer number of 201 and composed of alternately laminated 1st layers and 2nd layers each having the same thickness. The extrusion rates of the 1st layer and the 2nd layer were adjusted to 1:1 and the lamination was carried out to place the 1st layer at both surfaces. The multilayer undrawn film was drawn in the film-forming direction at 110° C. at a draw ratio of 3.6 and then drawn in lateral direction at 120° C. at a draw ratio of 3.9 and the product was subjected to heat-setting treatment at 240° C. for 3 seconds.

The physical properties of the obtained biaxially drawn multilayer laminated film are shown in the Table 6.

Examples 16 to 21 and Comparative Examples 9 to 12

The operations of the Example 15 were repeated except for the change of the thermoplastic resins for the 1st layer and the 2nd layer and the production conditions to those described in the Table 5. The term "IA12PET" described in the Table 5 as the kind of the resin of each layer is a polyethylene terephthalate copolymerized with 12 mol % isophthalic acid and having an intrinsic viscosity of 0.61 (in o-chlorophenol at 35° C.), "MX-D6" is m-xylylene adipamide, i.e. nylon MXD6 (product of Mitsubishi Gas Chemical Co., Inc.; commercial name "MX nylon 612"), "Ny6" is nylon 6 (product of Teijin DuPont Nylon KK; commercial name "nylon 6 Brite"), "Brend-2" is a resin produced by blending the MX-D6 with the Ny6 at a weight ratio of 80:20 (the blended resin is subjected to amide-exchange reaction by the kneading in molten state to lower the melting point depression similar to a copolymer resin; the melting point of the blended resin was 205° C. in a state extruded under the condition of the Example), "PET" is a polyethylene terephthalate having an intrinsic viscosity of 0.63 (in o-chlorophenol at 35° C.), "PLA" is a polylactate resin (product of Shimadzu Corp.; commercial name, Lacty 9010), "sPS" is a syndiotactic polystyrene (product of Idemitsu Petrochemical Co., Ltd.; commercial name, Syndiotactic polystyrene 30AC), and "PMMA" is a methacrylate resin (product of Asahi Chemical Ind. Co., Ltd.; commercial name Delpet 80N).

The physical properties of the obtained multilayer films are shown in the Table 6.

TABLE 5

| | | 1st layer | | | | 2nd layer | | Total | Drawing | | | | | Thickness | | |
| | | Resin | | Inert particle | | Resin | | | Film-forming direction | | Lateral direction | | Heat set | 1st | 2nd | |
| | | kind | mp (° C.) | kind | Addition amount wt % | No. of layers | kind | mp (° C.) | No. of layers | No. layers | draw ratio | temp (° C.) | draw ratio | temp (° C.) | temp (° C.) | layer (nm) | layer (nm) | total (μm) |
|---|---|---|---|---|---|---|---|---|---|---|---|---|---|---|---|---|---|---|
| Example | 15 | PEN | 269 | a | 0.15 | 101 | NDC10PET | 233 | 100 | 201 | 3.6 | 110 | 3.9 | 120 | 240 | 80 | 80 | 16 |
| | 16 | PEN | 269 | a | 0.15 | 101 | IA12PET | 223 | 100 | 201 | 3.6 | 110 | 3.9 | 120 | 240 | 80 | 80 | 16 |
| | 17 | MX-D6 | 237 | — | | 101 | Ny6 | 220 | 100 | 201 | 3.4 | 80 | 3.5 | 80 | 220 | 85 | 95 | 18 |
| | 18 | MX-D6 | 237 | — | | 101 | Brend-2 | (205) | 100 | 201 | 3.4 | 80 | 3.5 | 80 | 220 | 80 | 80 | 16 |
| | 19 | PET | 256 | a | 0.15 | 101 | PLA | 169 | 100 | 201 | 3.2 | 80 | 3.9 | 90 | 180 | 90 | 85 | 18 |
| | 20 | PEN | 269 | a | 0.15 | 101 | PLA | 169 | 100 | 201 | 4.0 | 120 | 4.1 | 125 | 180 | 80 | 90 | 17 |
| | 21 | sPS | 271 | — | | 101 | IA12PET | 223 | 100 | 201 | 3.5 | 120 | 4.0 | 125 | 230 | 80 | 80 | 16 |
| Comparative Example | 9 | PEN | 269 | — | | 101 | sPS | 271 | 100 | 201 | 3.6 | 115 | 4.0 | 120 | 240 | 75 | 80 | 16 |
| | 10 | PEN | 269 | — | | 101 | PMMA | — | 100 | 201 | 3.6 | 110 | 3.9 | 120 | 215 | 80 | 90 | 17 |
| | 11 | NDC10PET | 233 | — | | 101 | IA12PET | 223 | 100 | 201 | 3.6 | 75 | 3.9 | 75 | 220 | 80 | 85 | 17 |
| | 12 | PET | 269 | a | 0.15 | 101 | PMMA | — | 100 | 201 | 3.5 | 80 | 3.8 | 90 | 200 | 80 | 80 | 16 |

TABLE 6

| | | DSC results | | | Optical properties | | Thickness variation μm | | | |
| | | Crystallization peak ° C. | Low side mp. ° C. | High side mp ° C. | Max reflection wavelength nm | Reflection peak height % | Film-forming direction | Lateral direction | Freq. of delamination | Color mottle |
|---|---|---|---|---|---|---|---|---|---|---|
| Example | 15 | 140 | 230 | 264 | 540 | 98 | 1.9 | 06 | 0 | ○ |
| | 16 | 132 | 226 | 265 | 544 | 82 | 1.2 | 0.4 | 0 | ○ |
| | 17 | 74 | 223 | 235 | 595 | 62 | 2.3 | 1.3 | 0 | ○ |
| | 18 | 138 | 213 | 232 | 543 | 58 | 1.2 | 0.4 | 0 | ○ |
| | 19 | 120 | 165 | 249 | 612 | 84 | 2.8 | 2.7 | 4 | ○ |
| | 20 | 120 | 165 | 263 | 577 | 83 | 2.9 | 2.5 | 2 | ○ |
| | 21 | 131 | 226 | 269 | 545 | 83 | 1.0 | 0.6 | 2 | ○ |
| Comparative Example | 9 | — | — | 268 | 520 | 90 | 3.8 | 3.2 | 10 | — |
| | 10 | — | — | 265 | 521 | 96 | 2.6 | 6.4 | 0 | X |
| | 11 | — | — | 226 | — | — | 0.9 | 3.7 | 10 | X |
| | 12 | — | 246 | 264 | 544 | 89 | 3.2 | 2.1 | 0 | ○ |

INDUSTRIAL APPLICABILITY

The biaxially drawn multilayer laminated film of the present invention has excellent design by the structural color development, for example, an iridescent appearance. Furthermore, the film has excellent interlaminar adhesivity and high breaking strength and, accordingly, high industrial value. Especially, the biaxially drawn multilayer laminated polyester film of the present invention is useful as a packaging film to be exposed to outdoor light and required to have high mechanical properties durable to handling and protecting the packaged content as well as good decorative property. Further, it is extremely suitable as a fancy fiber slit to extremely narrow width and a fraudproof film as a substitute for a hologram seal taking advantage of the selective wavelength reflectivity. A film having a reflection peak in near infrared region is useful also as a heat-reflection film to shield near infrared rays and a near infrared cutting film for a plasma display.

The invention claimed is:

1. A biaxially drawn multilayer laminated film composed of a plurality of first layers and a plurality of second layers alternately laminated to a total layer number of 11 or more and subjected to biaxial drawing, provided that each layer has a thickness of 0.05 to 0.5 μm, each first layer is made of a polyester composition, each second layer is made of a polyester composition having a composition different from the composition of the resin constituting the first layer, the maximum reflectance of light within the wavelength range of 350 to 2,000 nm is higher than the base line reflectance obtained by the light reflection curve within the wavelength range of 350 to 2,000 nm by 20% or more, and the ratio of an ethylene terephthalate component in the film is 80% or more based on the total repeating units of the polyester, wherein the crystallization peak measured by differential scanning calorimetry is within the range of 100 to 190° C., wherein the polyester constituting the first layer is a crystalline polyester and at least 90 mol % of the total repeating units is ethylene terephthalate component, wherein the polyester constituting the second layer is a crystalline polyester and 75 to 97 mol % of the total repeating units is ethylene terephthalate component, wherein the breaking strengths of the film in both film-forming direction and lateral direction are 50 MPa or more.

2. A biaxially drawn multilayer laminated film described in claim 1, wherein the film has plural melting points measured by differential scanning calorimetry and the temperature difference between the melting points is 5° C. or more.

3. A biaxially drawn multilayer laminated film described in claim 1, wherein 1.5 to 20 mol % of the total repeating units is isophthalic acid component or 2,6-naphthalenedicarboxylic acid component.

* * * * *